(12) United States Patent
Song et al.

(10) Patent No.: US 7,992,588 B2
(45) Date of Patent: Aug. 9, 2011

(54) OPEN STATE MAINTAINABLE VALVE DEVICE FOR AN INFLATABLE ARTICLE

(76) Inventors: Rong-Jyh Song, Taipei (TW); Tsung-Ping Yen, Taipei (TW)

( * ) Notice: Subject to any disclaimer, the term of this patent is extended or adjusted under 35 U.S.C. 154(b) by 785 days.

(21) Appl. No.: 12/017,250

(22) Filed: Jan. 21, 2008

(65) Prior Publication Data
US 2009/0183781 A1 Jul. 23, 2009

(51) Int. Cl.
*F16K 15/20* (2006.01)
(52) U.S. Cl. ............... 137/512.1; 137/223; 251/149.2
(58) Field of Classification Search ............. 137/522, 137/523, 223, 298–303, 843, 854, 512.1; 251/149.2, 298, 303, 297, 82
See application file for complete search history.

(56) References Cited

U.S. PATENT DOCUMENTS

| 654,321 | A | * | 7/1900 | O'Crowley | 137/512.15 |
| 3,285,627 | A | * | 11/1966 | Kozulla et al. | 285/3 |
| 3,460,746 | A | * | 8/1969 | Forsythe et al. | 417/174 |
| 4,146,069 | A | * | 3/1979 | Angarola et al. | 141/68 |
| 4,683,916 | A | * | 8/1987 | Raines | 137/854 |
| 5,343,889 | A | * | 9/1994 | Jaw | 137/232 |
| 6,135,143 | A | * | 10/2000 | Po | 137/512.15 |
| 6,237,621 | B1 | * | 5/2001 | Chaffee | 137/223 |
| 7,293,721 | B2 | * | 11/2007 | Roberts | 239/204 |

* cited by examiner

*Primary Examiner* — John Rivell
*Assistant Examiner* — Macade Brown
(74) *Attorney, Agent, or Firm* — Schwegman, Lundberg & Woessner, P.A.

(57) ABSTRACT

A valve device includes a tubular member fitted into an inflatable article, a flexible diaphragm having a peripheral region which engages a valve seat of the tubular member through a mounting support and an intermediate surrounding region which has a portion that can be flexed to deflect a corresponding portion of the peripheral region from the valve seat, and a positioning member which is actuated to be displaced between normally-closed and deflating positions so as to bring an engaging end thereof to be proximate to or distal from the valve seat. In the deflating position, the flexed portion is vested with an increment of biasing force that is counteracted by a resisting force at an actuated end so as to keep the peripheral portion in a deflected position for maintaining the valve device in an open state.

6 Claims, 3 Drawing Sheets

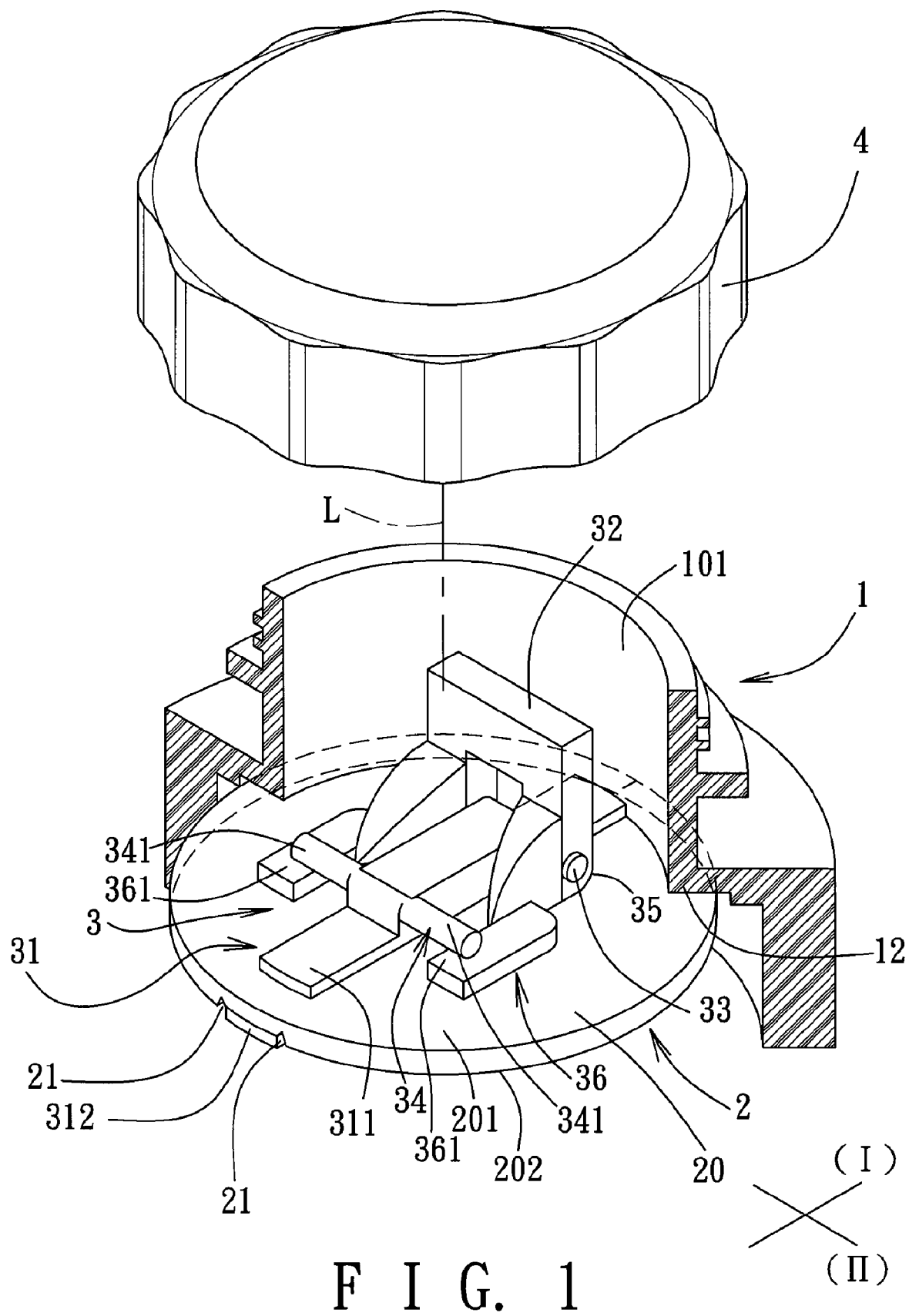
F I G. 1

OPEN STATE MAINTAINABLE VALVE DEVICE FOR AN INFLATABLE ARTICLE

BACKGROUND OF THE INVENTION

1. Field of the Invention

This invention relates to a valve device for an inflatable article, more particularly to a valve device with a diaphragm that can be kept in a deflected position to maintain the valve device in an open state for facilitating deflation of the inflatable article.

2. Description of the Related Art

A conventional inflatable article is generally provided with a check valve device in an inflating port. The check valve device has a flexible diaphragm that permits air to enter the inflatable article during inflation and that closes the inflating port by virtue of the air pressure inside the inflatable article when the inflation stops. However, with such a valve device, deflation of the inflatable article is inconvenient.

There is provided another conventional valve device that includes a flexible diaphragm which has a connecting surrounding portion attached to a valve seat of a tubular member thereof such that the flexible diaphragm can be depressed to deflect from the valve seat. Two retaining flanges extend from the valve seat and are disposed adjacent to the connecting surrounding portion such that the flexible diaphragm, when depressed, abuts against the retaining flanges so as to maintain the valve seat in an open state for deflation of the inflatable article. However, only a small portion of the diaphragm in the vicinity of the connecting surrounding portion is retained by the retaining flanges, so that the diaphragm is likely to disengage from the retaining flanges and close the valve seat by a large deflating force during deflation. Therefore, the user has to depress the diaphragm repeatedly, which is very inconvenient.

SUMMARY OF THE INVENTION

The object of the present invention is to provide a valve device with a diaphragm that can be kept in a deflected position to maintain the valve device in an open state for facilitating deflation of an inflatable article.

According to this invention, the valve device includes a tubular member, a diaphragm, and a positioning member. The tubular member is adapted to be fitted into an opening of an inflatable article, and forms an inflating port for an inflatable chamber of the inflatable article. The tubular member extends along a longitudinal axis and terminates at a valve seat facing towards the inflatable chamber.

The diaphragm is made from a flexible material, and has a major wall adapted to confront the inflatable chamber. The major wall includes a central region where the longitudinal axis passes through, a peripheral region which surrounds the central region and which is disposed to engage the valve seat, and an intermediate surrounding region interposed between the central and peripheral regions. The major wall is secured to the valve seat such that, when the major wall is subjected to a positive pressure at a side upstream of the valve seat, a portion of the intermediate surrounding region is flexed so as to deflect a corresponding portion of the peripheral region from the valve seat.

The positioning member includes an actuated end manually movable between a normally-closed position and a deflating position, and an engaging end which is disposed such that, when the actuated end is moved from the normally-closed position to the deflating position, the engaging end is kept in frictional engagement with the intermediate surrounding region, and is moved to be remote from the valve seat so as to place the corresponding portion of the peripheral region in a deflected position, while vesting the flexed portion of the intermediate surrounding region with an increment of biasing force to urge the engaging end to move towards the valve seat, and such that, a resisting force that is generated at the actuated end as a result of displacement of the actuated end from the normally-closed position to the deflating position is transmitted to the engaging end to counteract the increment of biasing force, thereby keeping the corresponding portion of the peripheral region in the deflected position.

BRIEF DESCRIPTION OF THE DRAWINGS

Other features and advantages of the present invention will become apparent in the following detailed description of the preferred embodiment of the invention, with reference to the accompanying drawings, in which:

FIG. 1 is a fragmentary perspective view of the preferred embodiment of a valve device according to this invention;

DETAILED DESCRIPTION OF THE PREFERRED EMBODIMENT

Figure 2:
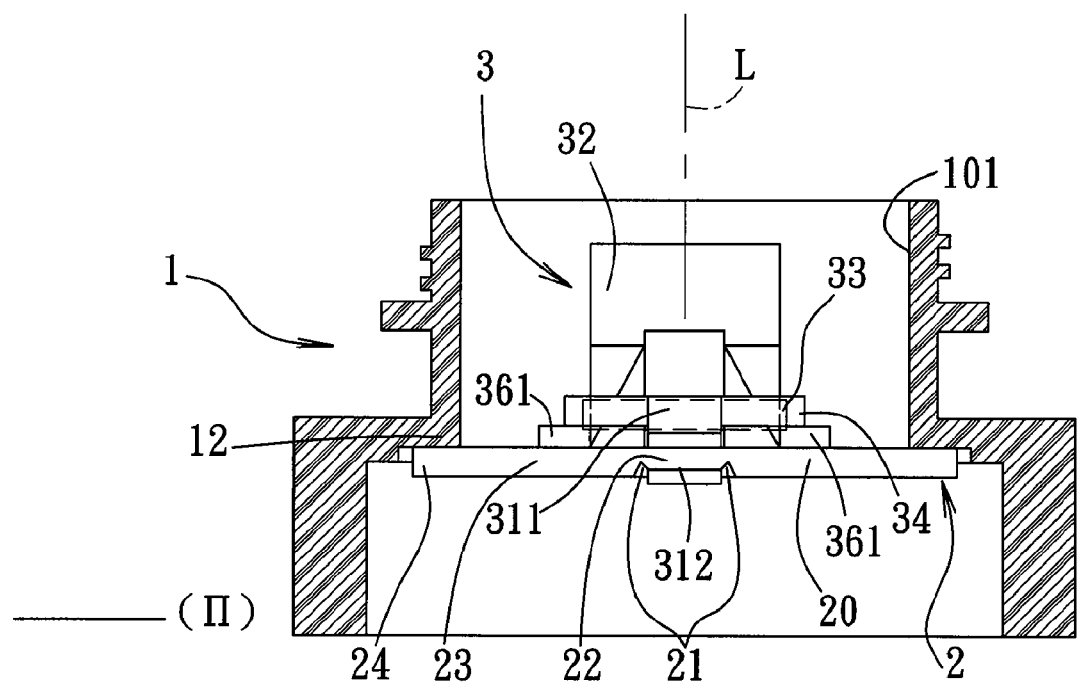
FIGS. 2 and 3 are sectional views respectively showing a diaphragm of the preferred embodiment in a normal position and a deflected position.
Figure 3:
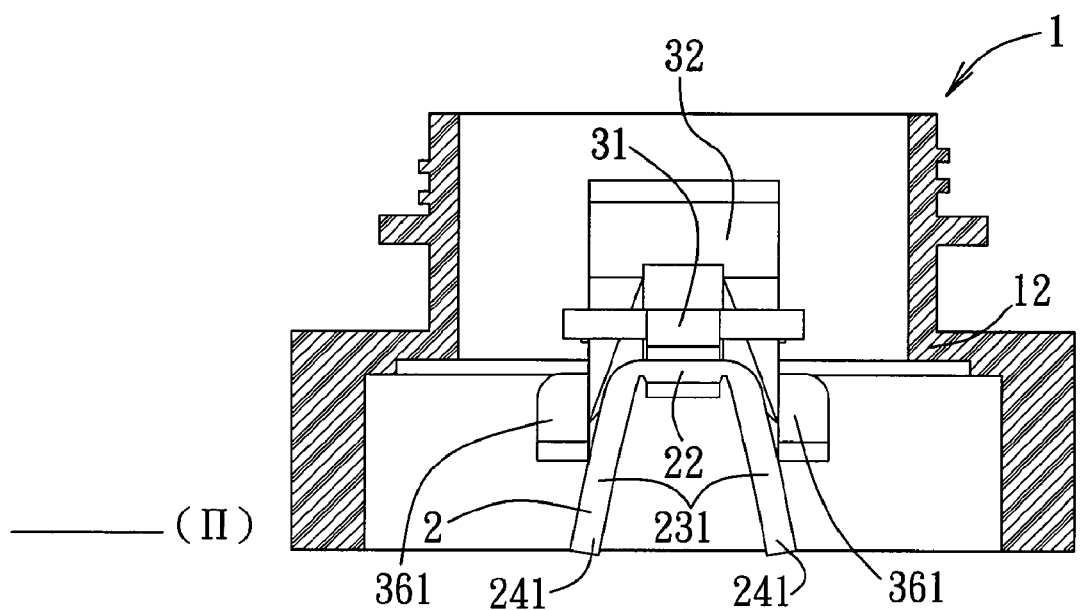

Referring to FIGS. 1 to 3, the preferred embodiment of a valve device according to the present invention is shown to comprise a tubular member 1, a diaphragm 2, a positioning member 3, and a cap member 4.

Figure 4:
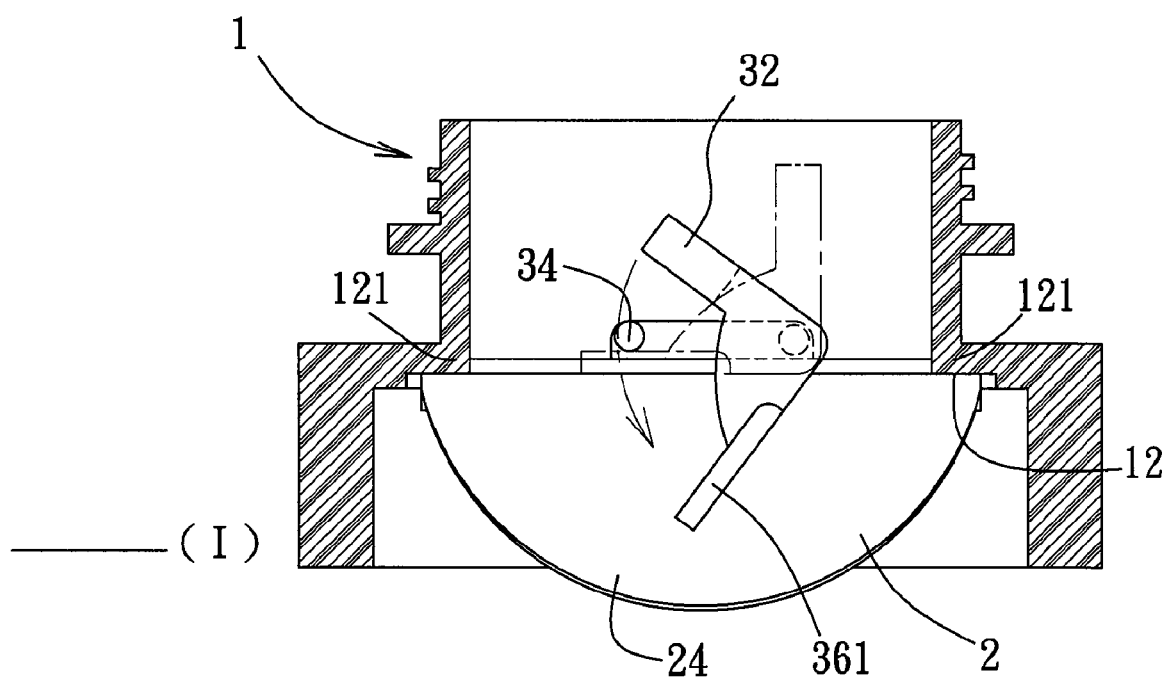
FIG. 4 is a sectional view showing a positioning member of the preferred embodiment in an operation state.

The tubular member 1 is adapted to be fitted into an opening of an inflatable article (not shown) to form an inflating port 101 for an inflatable chamber in the inflatable article. The tubular member 1 extends along a longitudinal axis (L) and terminates at a valve seat 12 that is adapted to face towards the inflatable chamber. As shown in FIG. 4, the valve seat 12 has two abutment areas 121 spaced apart from each other in a first transverse direction (I) transverse to the longitudinal axis (L).

The diaphragm 2 is made from a flexible material, such as rubber, and has a major wall 20 which has outer and inner major surfaces 201,202 opposite to each other along the longitudinal axis (L) such that the inner major surface 202 confronts the inflatable chamber. The major wall 20 includes a central region 22 where the longitudinal axis (L) passes through, a peripheral region 24 which surrounds the central region 22 and which is disposed to engage the valve seat 12, and an intermediate surrounding region 23 interposed between the central region 22 and the peripheral region 24.

A mounting support 31 extends in the first transverse direction (I) to secure the major wall 20 of the diaphragm 2 to the abutment areas 121 of the valve seat 12. Specifically, the mounting support 31 includes inner and outer support halves 312,311 which are spaced apart from each other along the longitudinal axis (L) and which clamp the diaphragm 2 therebetween such that, the intermediate surrounding region 23 is divided into left and right segments 231 to serve as a flexed portion, and the peripheral region 24 is divided into left and right peripheral segments 241 to serve as a corresponding portion.

When subjected to a positive pressure of introduced air at a side upstream of the valve seat 12 during inflation of the inflatable article, a portion of the intermediate surrounding region 23, i.e., the left and right flexed segments 231, is flexed so as to deflect the corresponding portion of the peripheral region 24, i.e., the left and right peripheral segments 241, from the valve seat 12.

The positioning member 3 has a fulcrum portion 35 which is pivotally mounted on the outer support half 311 by means of a pivot shaft 33 about a pivot axis in a second transverse direction (II) transverse to the first transverse direction (I), and actuated and engaging ends 32,36 which are disposed at two sides of the fulcrum portion 35 and which are angularly displaced from each other about the pivot axis. The engaging end 36 includes left and right contact fingers 361 which are disposed at two opposite sides of the outer support half 311. Thus, the actuated end 32 is manually turnable about the pivot axis between a normally-closed position, as shown in FIGS. 1 and 2, where the left and right contact fingers 361 are proximate to the valve seat 12, and a deflating position, as shown in FIG. 3, where the left and right contact fingers 361 are distal from the valve seat 12 so as to deflect the left and right peripheral segments 241 of the peripheral region 24 from the valve seat 12.

The cap member 4 is disposed to threadedly engage the tubular member 1 to openably close the inflating port 101.

When it is desired to deflate the inflatable article, the actuated end 32 is moved from the normally-closed position to the deflating position, so that the left and right contact fingers 361 are kept in frictional engagement with the intermediate surrounding region 23, and depress the left and right segments 231, respectively, so as to deflect the left and right peripheral segments 241 of the peripheral region 24, thereby placing the peripheral region 24 of the diaphragm 2 in a deflected position. When the peripheral region 24 of the diaphragm 2 is in the deflected position, the flexed left and right segments 231 are vested with an increment of biasing force (i.e. a restoring force of the flexible diaphragm 2) to urge the left and right contact fingers 361 to move towards the valve seat 12. Accordingly, a resisting force, that is generated at the actuated end 32 as a result of displacement of the actuated end 32 from the normally-closed position to the deflating position, is transmitted to the left and right contact fingers 361 to counteract the increment of biasing force, thereby keeping the flexed left and right segments 231 in the deflected position. As such, the valve seat 12 can be steadily kept in an open state to maintain the fluid communication between the inflatable chamber and the inflating port 101, thereby facilitating deflation of the inflatable article. Preferably, the inner major surface 202 of the diaphragm 2 has left and right grooves 21 which extend respectively in the first transverse direction (I), and which are adjacent to the inner support half 312 of the mounting support 31 to form left and right weakening lines, thereby facilitating deflection of the left and right corresponding areas 241 of the peripheral region 24.

In addition, a restriction member 34 is secured on and extends from the outer support half 311 of the mounting support 31 in the second transverse direction (II) to terminate at left and right restricting ends 341. When the left and right contact fingers 361 are urged by the increment of biasing force to turn the actuated end 32 to the normally-closed position, the left and right restricting ends 341 guard the left and right contact fingers 361 against further movement.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A valve device for an inflatable article which has an inflatable chamber and an opening fluidly communicated with the inflatable chamber, comprising:
   a tubular member which is adapted to be fitted into the opening, and which forms an inflating port for the inflatable chamber, said tubular member extending along a longitudinal axis and terminating at a valve seat that is adapted to face towards the inflatable chamber, said valve seat having two abutment areas spaced apart from each other in a first transverse direction transverse to the longitudinal axis;
   a diaphragm which is made from a flexible material, and which has a major wall adapted to confront the inflatable chamber, said major wall including
   a central region where the longitudinal axis passes through,
   a peripheral region which surrounds said central region, and which is disposed to engage said valve seat, and
   an intermediate surrounding region interposed between said central region and said peripheral region;
   a mounting support which extends in the first transverse direction to secure said major wall of said diaphragm to said abutment areas of said valve seat, said mounting support including inner and outer support halves which are spaced apart from each other along the longitudinal axis and which clamp said diaphragm therebetween such that said intermediate surrounding region is divided into left and right segments, and said peripheral region is divided into left and right peripheral segments, such that, when said major wall is subjected to a positive pressure at a side upstream of said valve seat, said left and right segments of said intermediate surrounding region are flexed so as to deflect left and right peripheral segments of said peripheral region from said valve seat; and
   a positioning member including an actuated end, an engaging end, and a fulcrum portion which is disposed between said actuated and engaging ends and which is pivotally mounted on said outer support half about a pivot axis in a second transverse direction transverse to the first transverse direction such that said actuated end is turnable about the pivot axis between a normally-closed position, where said engaging end is proximate to said valve seat, and a deflating position, where said engaging end is distal from said valve seat so as to place said left and right peripheral segments of said peripheral region in a deflected position, while vesting said left and right segments of said intermediate surrounding region with an increment of biasing force to urge said engaging end to move towards said valve seat such that, a resisting force that is generated at said actuated end as a result of displacement of said actuated end from the normally-closed position to the deflating position is transmitted to said engaging end to counteract the increment of biasing force, thereby keeping said left and right peripheral segments of said peripheral region in the deflected position.

2. The valve device according to claim 1, wherein said engaging end includes left and right contact fingers which are disposed at two opposite sides of said outer support half such that, when said actuated end is moved from the normally-closed position to the deflating position, said left and right contact fingers are brought to depress said left and right flexed segments, respectively, so as to deflect said left and right peripheral segments of said peripheral region, thereby placing said diaphragm in the deflected position.

3. The valve device according to claim 2, further comprising a restriction member which is secured on and which extends from said outer support half in the second transverse direction to terminate at left and right restricting ends such that, when said left and right contact fingers are urged by the increment of biasing force to turn said actuated end to the normally-closed position, said left and right restricting ends guard said left and right contact fingers against further movement.

4. The valve device according to claim 2, wherein said major wall of said diaphragm has outer and inner major surfaces opposite to each other along the longitudinal axis, said inner major surface having left and right grooves which extend in the first transverse direction, and which are adjacent to said inner support half to form left and right weakening lines, thereby facilitating deflection of said left and right peripheral segments of said peripheral region.

5. The valve device according to claim 1, wherein said engaging end is angularly displaced from said actuated end about the pivot axis.

6. The valve device according to claim 1, further comprising a cap member which is disposed to open and close said inflating port.

\* \* \* \* \*